United States Patent
Sachs et al.

(10) Patent No.: US 8,204,654 B2
(45) Date of Patent: Jun. 19, 2012

(54) SYSTEM AND METHOD FOR GENERATION OF AN INNER BOUNDARY OF A WORK AREA

(75) Inventors: James L. Sachs, Johnston, IA (US); Timothy J. Roszhart, Urbandale, IA (US); Tyler Schleicher, Ankeny, IA (US); Andy Dwayne Beck, Urbandale, IA (US); Mikel A. Bezdek, West Des Moines, IA (US)

(73) Assignee: Deere & Company, Moline, IL (US)

( * ) Notice: Subject to any disclaimer, the term of this patent is extended or adjusted under 35 U.S.C. 154(b) by 959 days.

(21) Appl. No.: 12/052,342

(22) Filed: Mar. 20, 2008

(65) Prior Publication Data

US 2009/0240430 A1     Sep. 24, 2009

(51) Int. Cl.
G01B 7/00      (2006.01)
G06F 7/70      (2006.01)
G06F 19/00     (2006.01)
G06G 7/00      (2006.01)
G06G 7/76      (2006.01)

(52) U.S. Cl. .............. 701/50; 702/155; 702/179; 700/1; 700/97; 700/99

(58) Field of Classification Search .............. 700/1, 90, 700/91, 97, 99; 702/127, 155, 179; 701/1, 701/50
See application file for complete search history.

(56) References Cited

U.S. PATENT DOCUMENTS

| | | | |
|---|---|---|---|
| 3,468,379 A | 9/1969 | Rushing el al. | |
| 3,606,933 A | 9/1971 | Rushing et al. | |
| 4,515,221 A | 5/1985 | Van Der Lely | |
| 4,518,044 A | 5/1985 | Wiegardt et al. | |
| 4,626,993 A | 12/1986 | Okuyama et al. | |
| 5,543,802 A | 8/1996 | Villevieille et al. | |
| 5,558,163 A | 9/1996 | Hollstein | |
| 5,606,850 A | 3/1997 | Nakamura | |
| 5,704,546 A | 1/1998 | Henderson et al. | |
| 5,899,950 A | 5/1999 | Milender et al. | |
| 5,961,573 A | 10/1999 | Hale et al. | |
| 5,978,723 A | 11/1999 | Hale et al. | |

(Continued)

FOREIGN PATENT DOCUMENTS

DE     102005008105     8/2006

OTHER PUBLICATIONS

Science fiction becomes farming fact. Profi Electronics. Precision Farming Event 2007. pp. 36-38, profi May 2007, Website: www.profi.co.uk.

(Continued)

*Primary Examiner* — Christopher J. Novosad

(57) ABSTRACT

A boundary definer or data processor establishes an outer boundary of a work area and defines an offset between an inner boundary and the outer boundary. A reference path module or data processor defines a primary reference path with a target angular heading within the work area. The reference path module or data processor generates secondary reference paths spaced apart from and generally parallel to the primary reference path. An incident angle estimator estimates an incident angle of incidence of the vehicle with the outer boundary. The former or data processor establishes an inner boundary point spaced apart from the outer boundary by the offset and coextensive with a corresponding one of the reference paths. Further, the former or data processor interconnects the established inner boundary points to form the inner boundary.

18 Claims, 6 Drawing Sheets

U.S. PATENT DOCUMENTS

| | | | |
|---|---|---|---|
| 5,991,694 A | 11/1999 | Gudat et al. |
| 6,085,134 A | 7/2000 | Adam |
| 6,119,069 A | 9/2000 | McCauley |
| 6,128,574 A | 10/2000 | Diekhans |
| 6,141,614 A | 10/2000 | Janzen et al. |
| 6,236,924 B1 | 5/2001 | Motz et al. |
| 6,266,595 B1 | 7/2001 | Greatline et al. |
| 6,336,051 B1 | 1/2002 | Pangels et al. |
| 6,345,231 B2 | 2/2002 | Quincke |
| 6,463,374 B1 | 10/2002 | Keller et al. |
| 6,681,551 B1 | 1/2004 | Sheidler et al. |
| 6,907,336 B2 | 6/2005 | Gray et al. |
| 6,934,615 B2 | 8/2005 | Flann et al. |
| 6,990,399 B2 | 1/2006 | Hrazdera et al. |
| 7,010,425 B2 | 3/2006 | Gray et al. |
| 7,079,943 B2 | 7/2006 | Flann et al. |
| 7,110,881 B2 | 9/2006 | Gray et al. |
| 7,162,348 B2 | 1/2007 | McClure et al. |
| 7,216,033 B2 | 5/2007 | Flann et al. |
| 7,228,214 B2 | 6/2007 | Flann et al. |
| 7,277,792 B2 | 10/2007 | Overschie |
| 7,451,030 B2 | 11/2008 | Eglington et al. |
| 7,502,678 B2 | 3/2009 | Diekhans et al. |
| 2003/0187560 A1 | 10/2003 | Keller et al. |
| 2003/0187577 A1 | 10/2003 | McClure et al. |
| 2003/0208319 A1 | 11/2003 | Ell et al. |
| 2004/0158355 A1 | 8/2004 | Holmqvist et al. |
| 2004/0193348 A1 | 9/2004 | Gray et al. |
| 2004/0193349 A1 | 9/2004 | Flann et al. |
| 2004/0217869 A1 | 11/2004 | Bouchard et al. |
| 2005/0075785 A1 | 4/2005 | Gray et al. |
| 2005/0273253 A1 | 12/2005 | Diekhans et al. |
| 2006/0025894 A1 | 2/2006 | O'Connor et al. |
| 2006/0064222 A1 | 3/2006 | Palmer |
| 2006/0142913 A1 | 6/2006 | Coffee et al. |
| 2006/0200294 A1 | 9/2006 | Scheufler et al. |
| 2006/0237200 A1 | 10/2006 | Unruh et al. |
| 2007/0186530 A1 | 8/2007 | Meier et al. |
| 2007/0192024 A1 | 8/2007 | Flann et al. |
| 2007/0255470 A1 | 11/2007 | Diekhans et al. |

OTHER PUBLICATIONS

Harringa, Emily. Farming The Easy Way. Professional Surveyor Magazine. Mar. 2007.

European Search Report, Nov. 9, 2011, 3 pages.

US 8,204,654 B2

SYSTEM AND METHOD FOR GENERATION OF AN INNER BOUNDARY OF A WORK AREA

FIELD OF THE INVENTION

This invention relates to a system and method for generating an inner boundary (e.g., a headland boundary) of a field or other work area.

BACKGROUND OF THE INVENTION

In agricultural applications, forestry applications, or other applications, a field or work area may be divided into various zones. For example, if a field is generally rectangular, the field may be divided into a central zone that is bounded by two end zones, which is somewhat analogous to an American football field. The outer perimeter or boundary of the rectangular field defines the sides of the central zone and the outer boundary of each end zone. In agricultural vernacular or terminology, these end zones are customarily referred to as "headlands." The general purpose of a headland is typically an area of the field where the vehicle and its implement can turn around after the completion of one pass, row or swath to begin another pass, row or swath.

If the outer boundary or perimeter of the field is known by a survey or otherwise, the operator has the task of estimating where to place the inner boundary of each headland. Accordingly, there is a need for generation of an inner boundary of a field for a headland or other zone where an outer boundary of the field is known.

SUMMARY OF THE INVENTION

A system and method for establishing an inner boundary of a work area comprises a boundary definer or data processor for establishing an outer boundary of a work area. The boundary definer or data processor defines an offset between an inner boundary and the outer boundary. The reference path module or data processor defines a primary reference path with a target angular heading within the work area. The reference path module or data processor generates secondary reference paths spaced apart from and generally parallel to the primary reference path. The incident angle estimator estimates an incident angle(s) of incidence of the reference paths (e.g., the primary reference path and the secondary reference paths) with the outer boundary. The inner boundary former or data processor establishes at least one inner boundary point spaced apart from the outer boundary by the offset. Further, the former or data processor interconnects the established inner boundary points to form the inner boundary.

DESCRIPTION OF THE PREFERRED EMBODIMENT

As used herein, a headland refers to an outer zone of a work area or field that is bounded by an inner boundary and at least part of an outer boundary of the work area. In one example, the headland may be uncultivated, unplanted or reserved for turning of a vehicle or agricultural equipment (e.g., along with any implement) at the end of one or more rows, paths or swaths. For instance, the headland may mean an area or turning area of the field where the vehicle and its implement can turn around after the completion of one pass, row or swath to begin another pass, row or swath. In another example, the headland is cultivated or planted with crop, but such that the seeds, plants, rootstock or other precursor to the crop is planted generally perpendicularly to those in a central zone of the field. Accordingly, where row crops are grown in the headland, the row crops have perpendicular rows that are oriented generally perpendicularly to the central rows in the central zone of the field.

Figure 1:
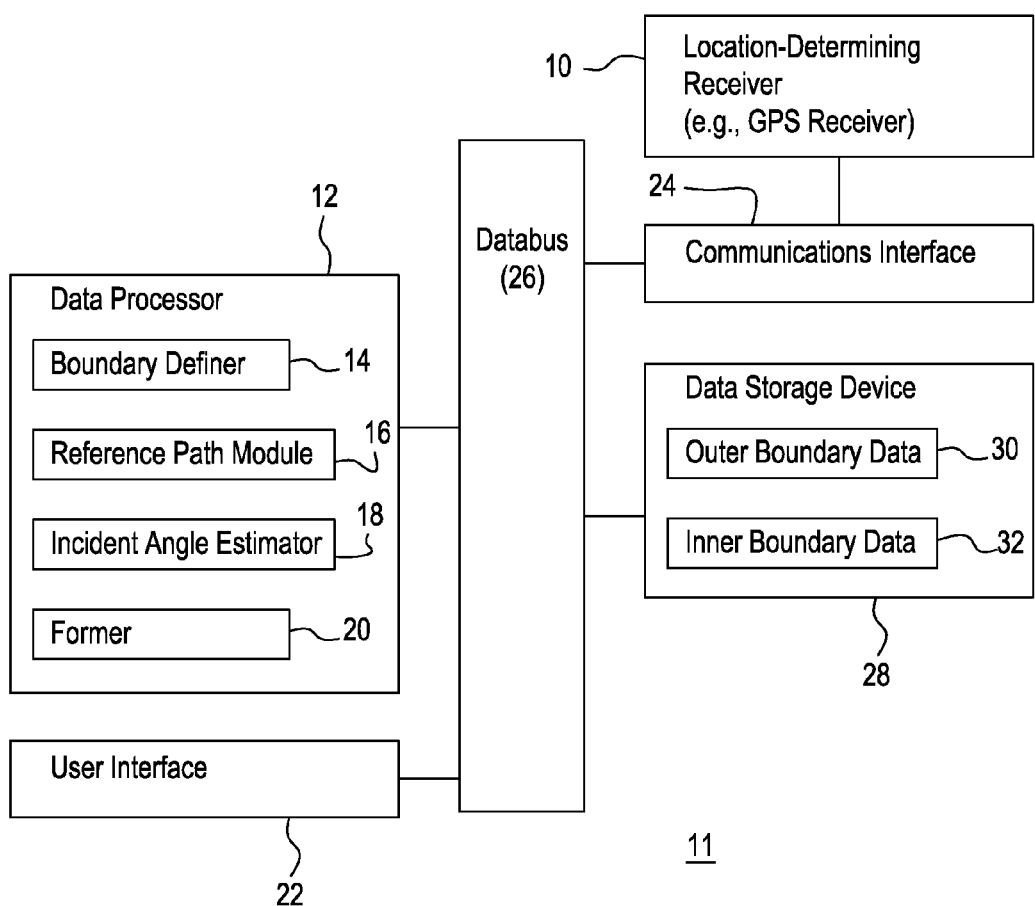
FIG. 1 is one embodiment of a block diagram of a system for generating an inner boundary or headland of a work area.

FIG. 1 is a block diagram of a system 11 for generating of an inner boundary or a headland. The system 11 of FIG. 1 comprises a location-determining receiver 10 that is coupled to a communications interface 24. In turn, the communications interface 24 is coupled to a data bus 26. A data processor 12 communicates with one or more of the following components via the data bus 26: the communications interface 24, a data storage device 28 and the user interface 22.

The location-determining receiver 10 may comprise a Global Positioning System (GPS) receiver. For example, the location-determining receiver 10 may comprise a GPS receiver with differential correction or a separate differential correction receiver. The location-determining receiver 10 provides an output of position data or coordinates for a vehicle on which the location-determining receiver 10 is mounted or carried.

The communications interface 24 may comprise a data buffer or electronic memory for storage of the position data or coordinates outputted by the location-determining receiver 10. Further, the communications interface 24 may support a data port and communications protocol for communications between the location-determining receiver 10 and the data processor 12.

In accordance with one embodiment, the data processor 12 comprises a boundary definer 14, a reference path module 16, an incident angle estimator 18, and a former 20.

The boundary definer 14 defines the boundary of a work area. The boundary definer 14 may comprise a module or software instructions for collecting, organizing and processing data points or coordinates provided by the location-determining receiver 10 as it traverses the outer boundary. In one example, boundary definer 14 may express the boundary as a series of points or coordinates. In another example, the boundary definer 14 may express the boundary as a series of line segments, curves, or arcs that are defined by linear, quadratic, or other equations. The work area may have virtually any shape. For example, the work area may be generally polygonal, rectangular, elliptical, circular, or irregularly shaped. In one embodiment, the boundary definer 14 determines an offset (e.g., a depth dimension of a headland) with respect to a normal axis to a corresponding segment of the outer boundary.

The reference path module 16 may comprise a module or software instructions for managing the collection, entry, or selection of a series of points or coordinates (or corresponding equations associated therewith) that form a reference path (e.g., primary reference path) for a vehicle. A reference path may refer to a primary reference path and one or more secondary reference paths. The secondary reference paths are aligned generally parallel to the primary reference path. As used herein, any reference path, whether primary or secondary, may be real or virtual. Real reference paths represent past, current or future paths of the vehicle that are reduced to control signals or control data for steering the vehicle. In contrast, virtual paths are possible paths, planning guides or tools for determination of inner boundary or a precursor thereto in a work area. The virtual reference paths are typically not directly or indirectly converted or reduced to control signals or control data for steering the vehicle.

The reference path module 16 may align or define the series of points to intercept an axis, a line, a contour or a curve that may be defined by one or more equations. In one configuration, the reference path (e.g., primary reference path) may be established by tracking the actual path of an operator operating the vehicle by recording or storing coordinates or position data of the location-determining receiver 10 on a regular basis (e.g., periodic basis). In another configuration, via the user interface 22 the operator may indicate, enter or select an angular bearing of the vehicle and the reference path module 16 may establish a reference path based on a generally linear path along the indicated angular bearing. Further, the reference path module 16 may establish secondary paths that are generally parallel to the reference path.

An incident angle estimator 18 comprises an estimator for estimating an incident angle between the reference path and the outer boundary of the work area. The estimator may graphically determine or use equations to estimate the incident angle. The incident angle estimator 18 may virtually project or extend the reference path (e.g., the primary reference path and the secondary reference path) to intercept the outer boundary, while noting the coordinates or position data at the intersection of the reference path and the outer boundary. The incident angle estimator 18 measures the incident angle between a projected axis associated with the reference path and a normal axis to the outer boundary. The desired angular range is approximately 0 degrees to approximately 15 degrees for the incident angle, although other desired angular ranges may work and fall within the scope of claims where no particular desired angular range is specified.

An inner boundary former 20 or formation module comprises a module for establishing at least one inner boundary point spaced apart from the outer boundary by an offset. The former 20 interconnects links or uses the established inner points to form the inner boundary. For example, the former 20 may identify or determine points on the inner boundary by one or more of the following techniques: best fit, a linear regression analysis, or minimization of the sum of the squares. Linear regression may use one or more equations to find a line that fits data points to minimize the sum of the squares of the vertical distances of the data points from the line. For a generally Gaussian distribution of data points, the minimization of the sum of the squares is likely to produce a best fit of the data points to a resultant line that describes a relationship between the values of the two axes (e.g., x, y).

The user interface 22 may comprise one or more of the following: a touchscreen, a keyboard, a keypad, a pointing device (e.g., mouse or trackball), a display, a console, or a switch to facilitate entering or inputting input data by the user or operator, or outputting or displaying output data to a user or operator.

The data storage device 28 may comprise an electronic, optical, or magnetic storage device for storing and retrieving data. Electronic data storage device may include random access memory, read only memory, flash memory, NAND memory and other types of electronic memory. The data storage device 28 may store outer boundary data 30, inner boundary data 32, or both. Further, the data storage device 28 may store the reference path data and incident angle data for corresponding segments of the outer boundary.

Although the embodiment of FIG. 1 shows a data bus 26, it is understood that other architectures may be used where the data bus 26 is replaced by a logical communications path, a physical communications path, or both. A logical communications path may support a logical communications, a virtual communications path or a software communications path between two or more components, whereas a physical communications path may comprise hardware or physical communication paths between two or more components.

Figure 2:
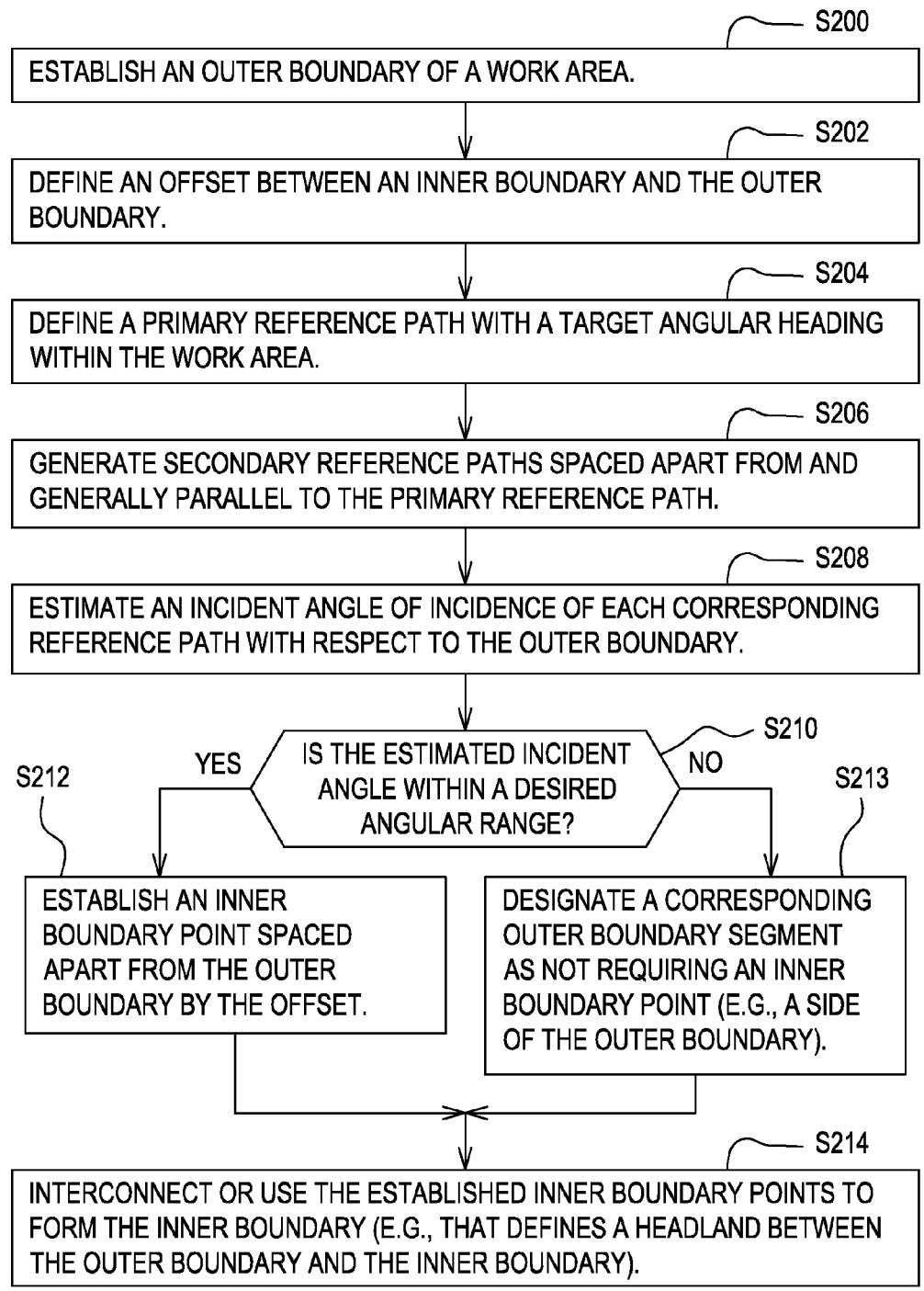
FIG. 2 is a flow chart of one embodiment of a method for generating an inner boundary or headland of a work area.

FIG. 2 illustrates a flow chart of a method for generating an inner boundary or a headland. The method of FIG. 2 begins in step S200.

In step S200, a boundary definer 14 or data processor 12 establishes an outer boundary of a work area. For example, an operator may define the outer boundary by driving or traversing the outer boundary while a mobile, co-located location-determining receiver 10 or another survey instrument measures (e.g., at regular intervals) stores coordinates or data points of the outer boundary. The data storage device 28 may store coordinates or data points.

In step S202, a boundary definer 14 or data processor 12 defines an offset between an inner boundary and the outer boundary. Step S202 may be carried out in accordance with various techniques that may be applied alternately or cumulatively. Under a first technique, the offset is determined with respect to a normal axis to a corresponding identifiable segment of the outer boundary. The identifiable segment of the outer boundary may be identified by its position, coordinates, cellular location, or a group of position points or coordinate.

Under a second technique, the offset is used to determine the size of the headland or the size of the headland at each edge of the field. The headlands, associated with different edges of the same field, may be the same or different in size.

Under a third technique, the offset between the inner boundary and the outer boundary (or the headland) may be based on the turning radius of the vehicle, the physical dimensions (e.g., wheelbase, width, or length) of the vehicle, the turning radius of any implement that is pushed, pulled, towed, carried or moved by the vehicle, and the physical dimensions of the implement (e.g., implement wheelbase (if any), width, or length).

Under a fourth technique, the offset is defined such that a vehicle can execute one or more turns in a zone between the inner boundary and the outer boundary. The offset may vary depending upon whether the desired turn to be executed is a row-skipping turn or a bulb-shaped turn. In general, a bulb-shaped turn to an adjacent row requires a greater offset or depth dimension than a row-skipping turn.

Under a fifth technique, the offset is defined such that a vehicle can plant crops, seeds, plants, rootstock or another precursor to the crop in parallel rows in a zone between the inner boundary and the outer boundary, where the parallel rows are oriented generally perpendicularly to at least some rows outside the zone.

In step S204, the reference path module 16 or data processor 12 defines a primary reference path with a target angular heading within the work area. The primary reference path may be generally linear, a contour with curved and linear segments, or the like. If the primary reference path is generally linear, the primary reference path may be associated with a heading (e.g., angular heading) or direction relative to a reference (e.g., due North or magnetic North). Step S204 may be carried out in accordance with various techniques that may be applied alternately or cumulatively. Under a first technique, the reference path module 16 facilitates recording or storage of the coordinates or position data for a primary reference path that is driven by an operator of a vehicle. Under a second technique, the reference path module 16 facilitates recording or storage of the coordinates or position data for a primary reference path that is driven by an operator of a vehicle who has a location-determining receiver 10 for tracking a desired target path. Under a third technique, the reference path module 16 facilitates recording or storage of the coordinates or position data for a primary reference path driven by an operator that is corrected (e.g., electronically) to conform to a desired or target path (e.g., a target linear path, a target contour path, or a curved path with a certain radius or elliptical path segment). Under a fourth technique, if the outer boundary is generally rectangular, the target angular heading may be selected such that the incident angle (of step S208 and step S210) falls within a desired range for top portion and bottom portion of a generally rectangular outer boundary and falls outside of the desired range for a side portions of the generally rectangular outer boundary.

In step S206, the reference path module 16 or data processor 12 generates secondary reference paths spaced apart from and generally parallel to the primary reference path. For example, the secondary reference paths may be spaced apart by vehicle widths, implement widths, or otherwise.

In step S208, an incident angle estimator 18 or data processor 12 estimates one or more incident angles of incidence of each corresponding reference path with respect to (one or more corresponding segments of) the outer boundary. The incident angle estimator 18 or data processor 12 determines all intersections of the reference paths (e.g., primary paths and secondary paths) with the outer boundary and the associated incident angles. For example, if the work area is generally rectangular, polygonal, circular or elliptical or a closed loop, each reference path will intersect the outer boundary at two points: (1) a first intersection point or first outer boundary segment at a first incident angle, and (2) a second intersection point a or a second outer boundary segment at a second incident angle. The first incident angle may equal the second incident angle, where opposite boundary segments or sides of the outer boundary are generally parallel to each other. If the outer boundary bounds a generally rectangular area, the evaluation of the incident angle(s) (e.g., the first incident angle and the second incident angle) with respect to the desired angular range facilitate(s) automatic determination of at least one of the sides, top and bottom of the work area for placement of the headland or similar zone at the top and bottom. Where the outer boundary or work area deviates from a generally rectangular area, one or more supplemental zones (e.g., supplemental headlands) may be allocated for one or more sides or segments of the work area.

In one example of carrying out step S208, the estimator 18 or data processor 12 estimates the incident angle comprising a first incident angle with respect to a first segment of the outer boundary and a second incident angle with respect to a second segment of the outer boundary opposite to the first segment, wherein the segments (e.g., first segment and second segment) intersect with the reference paths (e.g., the primary reference path and one or more secondary reference paths) such that the first incident angle is substantially the same as or different from the second incident angle to facilitate location of the headlands (e.g., consistent with the evaluation of the incident angles relative to the target or desired angular range). A headland or zone (e.g., a turning zone or supplemental zone) is associated with a first or second incident angle where the incident angle is within a desired angular range.

The reference path includes a primary reference path and secondary reference paths. The incident angle estimator 18 may determine an incident angle for the primary reference path and each secondary reference path to identify corresponding segments of the outer boundary that should be associated with an inner boundary or a headland. In one embodiment, the incident angle is measured between a projected axis associated with the incident angle and a normal axis to the outer boundary.

In step S210, the incident angle estimator 18 or data processor 12 determines if the estimated incident angle is within a desired angular range or target angular range. For example, each reference path is associated with one or more estimated incident angles, where each incident angle falls within or outside of the desired angular range. Where the work area is generally rectangular, polygonal, circular, elliptical or close looped; each reference path may be associated with two incident angles: a first incident angle and a second incident angle. The estimator 18 facilitates automatically distinguishing between the sides and the top and bottom of a generally rectangular work area to facilitate identification of the location of headlands at the top and bottom. Although other angular ranges fall within the scope of the claims, in one embodiment, the desired angular range is approximately 0 degrees to approximately 15 degrees for the incident angle. "Approximately" means that the incident angle may vary by plus or minus five percent or greater from any value expressed in degrees or radians. If the estimated incident angle is within a desired angular range, the method continues with step S212. However, if the estimated incident angle is not within the desired angular range, the method continues with step S213.

In step S212, the data processor 12 or former 20 establishes an inner boundary point spaced apart from the outer boundary by the offset. In one example, the data processor 12 or former 20 establishes the offset by a perpendicular distance between the outer boundary and the inner boundary to achieve a headland size or turning area that is sufficient to safely execute a turn with the vehicle and its implement with adequate clearance. User input may be augmented by the specifications on the minimum turning radius of the vehicle and its implement to facilitate establishment of a headland of sufficient size to safely execute a turn with adequate clearance, where a safety clearance margin may be added for position drift of the location-determining receiver 10, measurement errors of the location-determining receiver 10, or slippage of the vehicle wheels or tracks on the ground (e.g., associated with moisture or soil conditions). In another example, the data processor 12 or former 20 establishes one or more inner boundary points spaced apart from a corresponding segment of the outer boundary by the offset if the incident angle is within the desired angular range. In yet another example, the data processor 12 or former 20 may establish an inner boundary point spaced apart from the outer boundary by an offset that is normal to or generally perpendicular to a segment of the outer boundary, where the inner boundary points are established with a certain desired resolution or lateral spacing from each other. For instance, in one embodiment, the inner boundary points are established merely to be coextensive with each of the primary and secondary reference paths.

In step S213, a data processor 12 designates a corresponding outer boundary segment not requiring an inner boundary point (e.g., a side of the outer boundary).

In step S214, the data processor 12 or former 20 interconnects or uses the established inner boundary points to form the inner boundary (e.g., that defines a headland between the outer boundary and inner boundary.)

After step S214, the data processor 12 (e.g., or the planner 52 of FIG. 5) may plan a path plan of the vehicle such that the vehicle executes one or more turns in a zone between the inner boundary and the outer boundary. The turns may comprise row-skipping turns in which one or more rows are skipped, where rows have row width defined by a physical vehicle width or its implement width, less any overlap allowance between adjacent rows. In another embodiment, after step S214 a planner 52 plans a path of the vehicle such that the vehicle plants crops, seeds, plants, rootstock or another precursor to the crop in parallel rows that are generally perpendicular to the longitudinal portion of the work area, except in the zone between the inner boundary and the outer boundary where end rows are oriented generally perpendicular to the parallel rows.

Figure 3:
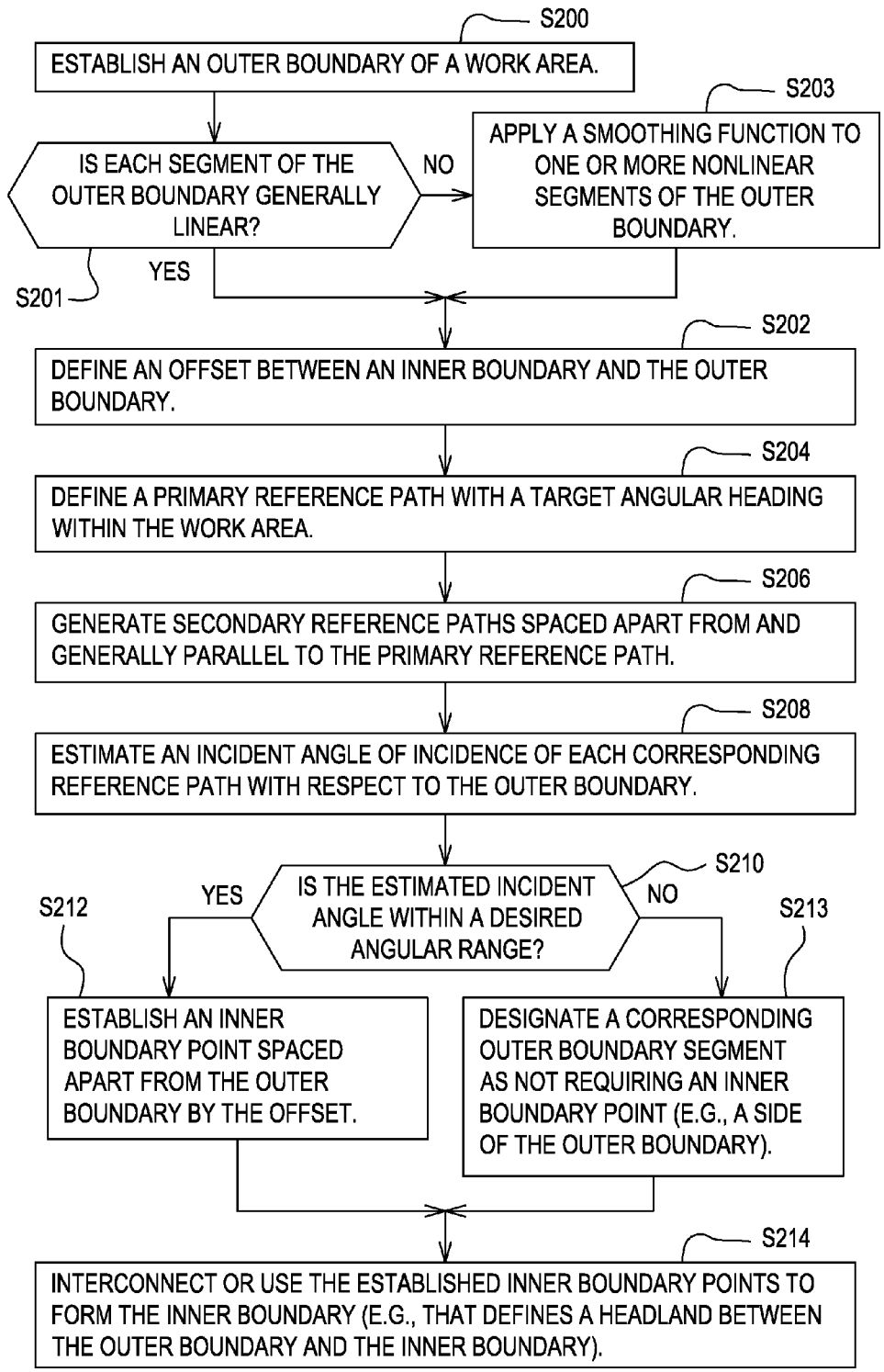
FIG. 3 is a flow chart of another embodiment of a method for generating an inner boundary or headland of a work area.

The method of FIG. 3 is similar to the method of FIG. 2, except the method of FIG. 3 further comprises step S201 and S203. Like reference numbers in FIG. 2 and FIG. 3 indicate like steps or procedures.

Step S201 may be executed following step S200, for example. In step S201, a boundary definer 14 or data processor 12 determines if each segment of the outer boundary is generally linear. If the segments of the outer boundary are generally linear, the method of FIG. 3 continues with step S202. However, if one or more segments of the outer boundary are not generally linear, then the method continues with step S203.

In step S203, a filter 50 or data processor 12 applies a smoothing function or filtering response to the generally nonlinear segment or segments of the outer boundary. The smoothing function or filtering response may be selected to remove jagged edges or discontinuities and to make the upper portion or lower portion of the outer boundary more linear than it otherwise would be. For example, the smoothing function may take a geometric average of the upper portion or lower portion of data points along the outer boundary. The smoothing function may facilitate reduction of erroneous incident angles that might otherwise result from the jagged or irregularities in the outer boundary.

Figure 4:
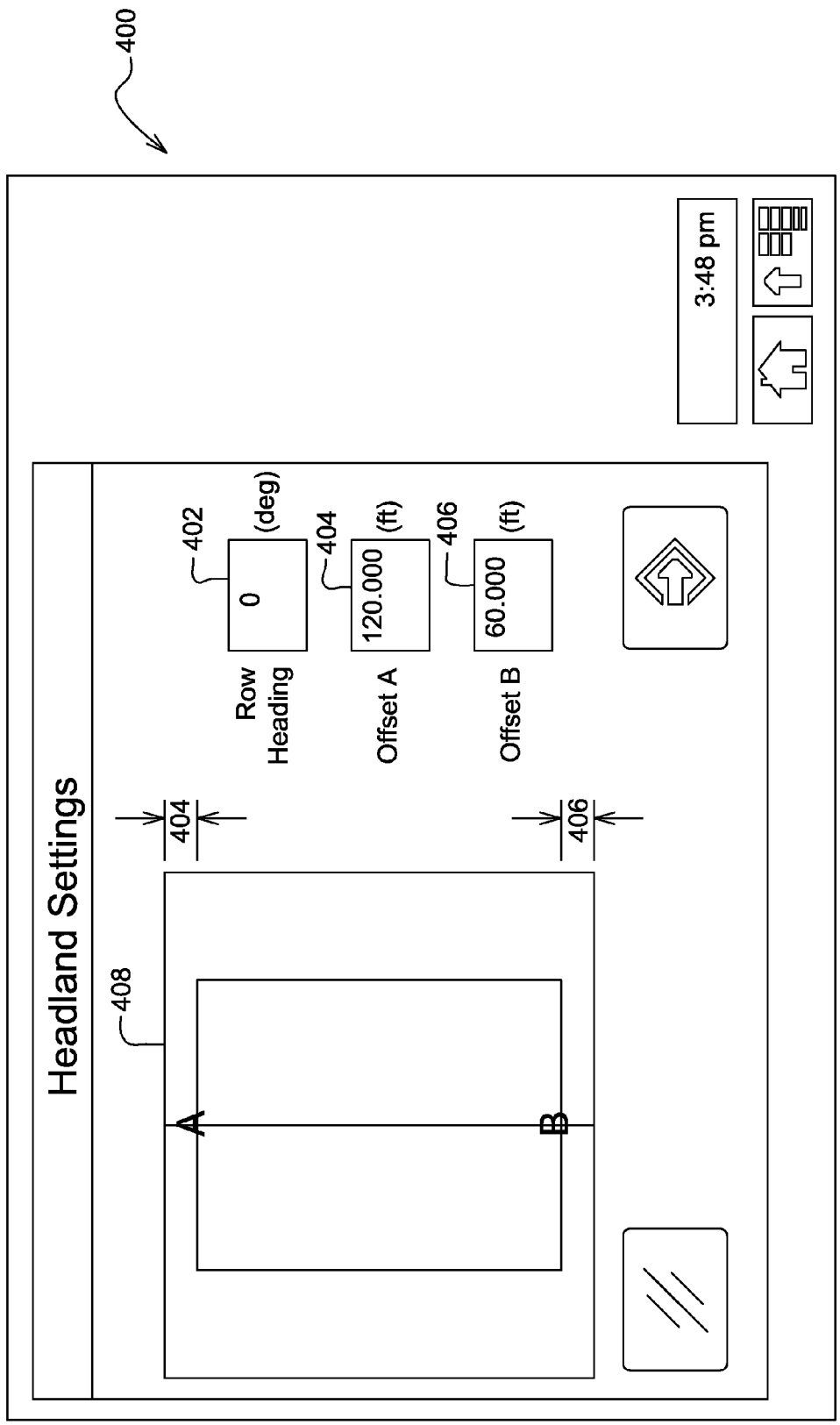
FIG. 4 is an illustrative screen shot or image displayed by a user interface of the system for generating an inner boundary.

FIG. 4 shows an illustrative screen shot or image that may be displayed on a user interface 22. In the illustrative example, an operator may enter a row heading 402 in degrees, a first offset 404 (e.g., offset A), and a second offset 406 (e.g., offset B). A window 408 illustrates the application of the entered row heading 402, first offset 404 and second offset 406. The screen shot and image of FIG. 4 is merely shown for illustrative purposes and other images or arrangement of the user interface 22 may fall within the scope of any claimed subject matter.

Figure 5A:
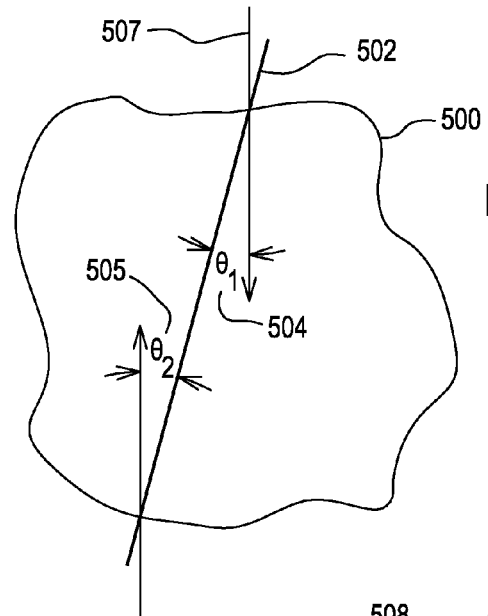
FIG. 5A is diagram that shows an overhead view looking downward onto a work area with an outer boundary.

FIG. 5A shows an outer boundary 500 and primary reference path 502. The primary reference path 502 makes a first incident angle ($\theta_1$) 504 with respect to an upper portion and a second incident angle ($\theta_2$) 505 with respect to a lower portion of the outer boundary 500. The outer boundary 500 of the work area may have been established in accordance with step S200 of FIG. 2 and the primary reference path 502 may be established in accordance with step S204.

Figure 5B:
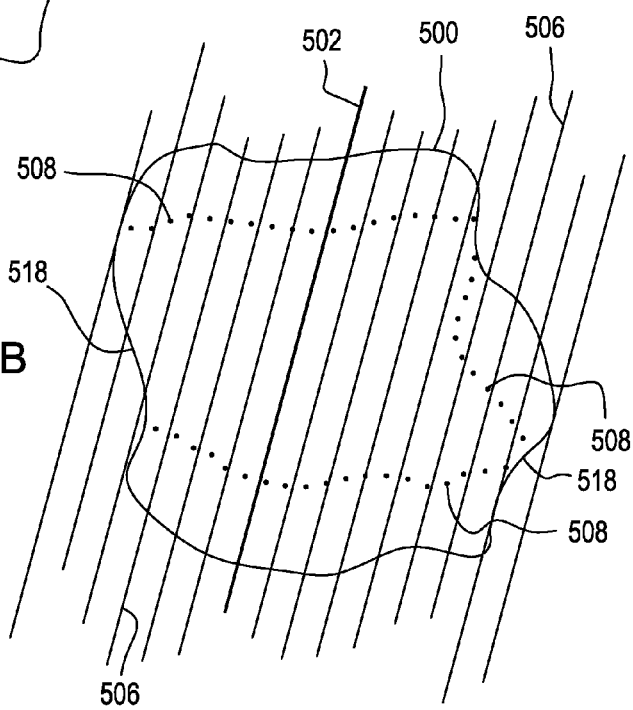
FIG. 5B is a diagram that shows an overhead view looking downward onto a work area with a primary path and secondary paths.

FIG. 5B builds upon FIG. 5A. Like reference numbers in FIG. 5A and FIG. 5B indicate like elements. FIG. 5B shows secondary reference paths 506 spaced apart and generally parallel to the primary reference path 502, consistent with step S206. Further, FIG. 5B shows the establishing of inner boundary points 508 spaced apart from the outer boundary 500 by an offset, consistent with step S212. It should be noted that the sides 518 or vertical regions of the outer boundary 500 are such that the estimated incident angle falls outside the desired angular range. Accordingly, the sides 518 are designated as corresponding outer boundary 500 segments that do not require an inner boundary point, consistent with step S213. However, because of the departure of the outer boundary from that of a generally rectangular area, a zone or headland may be allowed on or near one or more sides of the outer boundary, as indicated by supplemental zone 609. The supplemental zone 609 provides a turning area for a vehicle with an offset, for example.

Figure 5C:
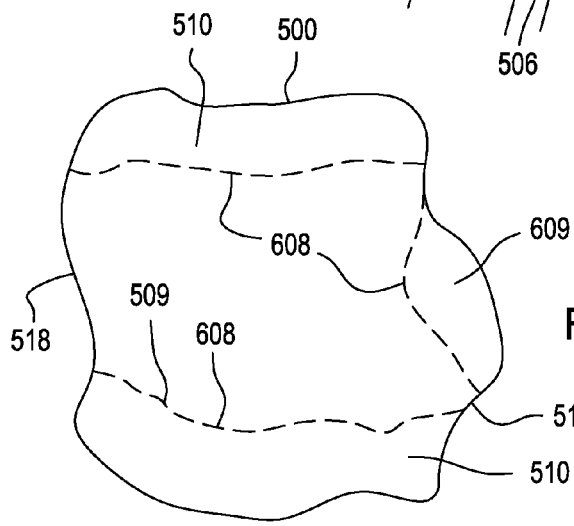
FIG. 5C is diagram that shows an overhead view of a work area with an outer boundary and an established inner boundary.

FIG. 5C shows the inner boundary 608 as a dashed line or contour. Like reference numbers in FIG. 5C and FIG. 5B indicate like elements. The inner boundary 608 may be formed by interconnecting, linking or using the established inner boundary points 508, consistent with step S214. The interconnection may be supplemented by geometric averaging, linear regression analysis, best fit or minimization of a squares error to identify a suitable contour or line segment for the inner boundary. The resultant zone, area or headland between inner boundary and the outer boundary may be different for different vehicles or equipment. Accordingly, the offset selected or inputted by the operator in step S202 may be specific or particular to a corresponding vehicle or combination of a vehicle and implement because of the turning radius and maneuverability of the vehicle.

Figure 6:
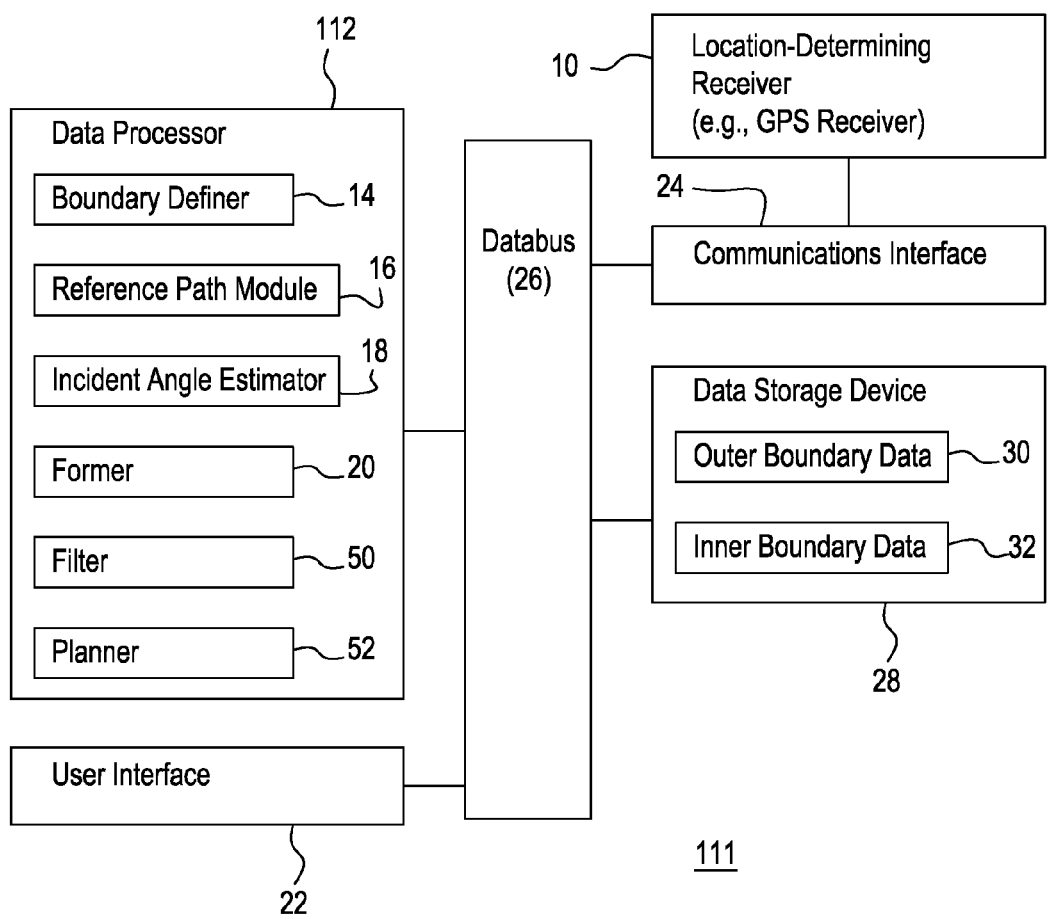
FIG. 6 is another embodiment of a block diagram of a system for generating an inner boundary or headland of a work.

The system 111 of FIG. 6 is similar to the system 11 of FIG. 1, except the data processor 112 of FIG. 6 further comprises a filter 50 and a planner 52.

The filter 50 is capable of applying a smoothing function to the outer boundary to smooth discontinuities or jagged features of the outer boundary prior to estimating the incident angle. In one example, the smoothing function is based on a geometric mean of the outer boundary.

In one embodiment, the planner 52 is capable of planning a path of a vehicle such that the vehicle executes one or more turns in a zone between the inner boundary and the outer boundary. In another embodiment, the planner 52 is capable of planning a path of the vehicle such that the vehicle plants crops, seeds, plants, rootstock or another precursor to the crop in parallel rows that are generally perpendicular to the longitudinal portion of the work area, except in the zone between the inner boundary and the outer boundary where end rows are oriented generally perpendicular to the parallel rows.

The method and system is well suited for the operator's saving time and expenses of driving along an inner boundary to store coordinate points.

Having described the preferred embodiment, it will become apparent that various modifications can be made without departing from the scope of the invention as defined in the accompanying claims.

The following is claimed:

1. A method for establishing an inner boundary of a work area, the method comprising the steps of:
    establishing an outer boundary of a work area;
    defining an offset between an inner boundary and the outer boundary;

defining a primary reference path with a target angular heading within the work area;

generating secondary reference paths spaced apart from and generally parallel to the primary reference path;

estimating an incident angle of incidence of the vehicle with the outer boundary;

establishing one or more inner boundary points spaced apart from a corresponding segment of the outer boundary by the offset if the incident angle is within a desired angular range, and interconnecting or using the established inner boundary points to form the inner boundary and to form an outer zone of the work area between the inner boundary and at least part of the outer boundary.

2. The method according to claim 1 wherein the work area is a generally rectangular work area and wherein evaluation of the incident angle with respect to the desired angular range facilitates automatic determination of at least one of the sides, top and bottom of the work area to facilitate location of the outer zone comprising headlands at the top and bottom of the work area.

3. The method according to claim 1 wherein the estimating of the incident angle comprises estimating a first incident angle with respect to a first segment of the outer boundary and a second incident angle with respect to a second segment of the outer boundary opposite to the first segment, wherein the segments intersect with the reference paths such that the first incident angle being substantially the same as or different from the second incident angle to facilitate location of the outer zone comprising headlands.

4. The method according to claim 1 wherein the offset is determined with respect to a normal axis to a corresponding segment of the outer boundary.

5. The method according to claim 1 wherein the incident angle is measured between a projected axis associated with the incident angle and a normal axis to the outer boundary.

6. The method according to claim 5 wherein the desired angular range is approximately 0 degrees to 15 degrees for the incident angle.

7. The method according to claim 1 further comprising:
applying a smoothing function to the outer boundary to smooth discontinuities or jagged features of the outer boundary prior to estimating the incident angle, wherein the smoothing function is based on a geometric mean of the outer boundary.

8. The method of claim 1 further comprising:
defining the offset such that a vehicle can execute one or more turns in the outer zone between the inner boundary and the outer boundary.

9. The method of claim 1 further comprising:
defining the offset such that a vehicle can plant crops, seeds, plants, rootstock or another precursor to the crop in parallel rows in the outer zone, where the parallel rows are oriented generally perpendicularly to at least some rows outside the outer zone.

10. A system for establishing an inner boundary of a work area, the system comprising the steps of:
a boundary definer for establishing an outer boundary of a work area, the boundary definer arranged to define an offset between an inner boundary and the outer boundary;

a reference path module for defining a primary reference path with a target angular heading within the work area, the reference path module arranged to generate secondary reference paths spaced apart from and generally parallel to the primary reference path;

an incident angle estimator for estimating an incident angle of incidence of the vehicle with the outer boundary; and a former for establishing an inner boundary point spaced apart from the outer boundary by the offset if the estimated incident angle falls within a desired angular range, the former configured to interconnect the established inner boundary points to form the inner boundary and to form an outer zone of the work area between the inner boundary and at least part of the outer boundary.

11. The system according to claim 10 wherein the work area is a generally rectangular work area and wherein evaluation of the incident angle with respect to the desired angular range facilitates automatic determination of at least one of the sides, top and bottom of the work area to facilitate location of the outer zone comprising headlands at the top and bottom of the work area.

12. The system according to claim 10 wherein the estimating of the incident angle comprises estimating a first incident angle with respect to a first segment of the outer boundary and a second incident angle with respect to a second segment of the outer boundary opposite to the first segment, wherein the segments intersect with the reference paths such that the first incident angle is substantially the same as or different from the second incident angle to facilitate location of the outer zone comprising headlands.

13. The system according to claim 10 wherein the boundary definer determines the with respect to a normal axis to a corresponding segment of the outer boundary.

14. The system according to claim 10 wherein the incident angle estimator measures the incident angle between a projected axis associated with the incident angle and a normal axis to the outer boundary.

15. The system according to claim 10 wherein the desired angular range is approximately 0 degrees to 15 degrees for the incident angle.

16. The system according to claim 15 further comprising:
a filter for applying a smoothing function to the outer boundary to smooth discontinuities or jagged features of the outer boundary prior to estimating the incident angle, wherein the smoothing function is based on a geometric mean of the outer boundary.

17. The system of claim 10 further comprising:
a planner for planning a path of the vehicle such that the vehicle executes one or more turns in the outer zone.

18. The system of claim 10 further comprising:
a planner for planning a path of the vehicle such that the vehicle plants crops, seeds, plants, rootstock or another precursor to the crop in parallel rows that are generally perpendicular to the longitudinal portion of the work area, except in the outer zone between the inner boundary and the outer boundary where end rows are oriented generally perpendicular to the parallel rows.

* * * * *